US006234283B1

United States Patent
Montes-Ramos

(10) Patent No.: US 6,234,283 B1
(45) Date of Patent: May 22, 2001

(54) BRAKE BEAM STRUCTURE

(75) Inventor: Miguel-Angel Montes-Ramos, Monterrey (MX)

(73) Assignee: Acertek, S.A. de C.V., Monterrey (MX)

( * ) Notice: Subject to any disclaimer, the term of this patent is extended or adjusted under 35 U.S.C. 154(b) by 0 days.

(21) Appl. No.: 09/256,891

(22) Filed: Feb. 24, 1999

(51) Int. Cl.$^7$ .................................................. B61H 13/36
(52) U.S. Cl. .................................. 188/219.1; 188/226.1; 188/228.1
(58) Field of Search ............................. 188/219.1, 226.1, 188/223.1, 223.6, 228.6, 225.6, 233.3, 229.1, 228.1, 222.1

(56) References Cited

U.S. PATENT DOCUMENTS

| | | | | |
|---|---|---|---|---|
| 605,800 | * | 6/1898 | Robischung | 188/223.1 |
| 2,702,614 | | 2/1955 | Spaeth | 188/223.1 |
| 2,722,291 | | 11/1955 | Welp | 188/223.1 |
| 2,753,960 | | 7/1956 | Stevens | 188/223.1 |
| 3,998,299 | * | 12/1976 | Fuller | 188/223.1 |
| 4,830,148 | | 5/1989 | Hart et al. | 188/52 |
| 5,810,124 | | 9/1998 | Sandmann | 188/226.1 |

* cited by examiner

Primary Examiner—Douglas C. Butler
Assistant Examiner—Pamela J. Rodriguez
(74) Attorney, Agent, or Firm—Abelman, Frayne & Schwab

(57) ABSTRACT

A brake beam structure comprising compression and tension members having an "u" shaped cross section including two side walls and forming a housing, two end extensions having a quadrangular cross section including two side walls, a fulcrum coupled to the compression and tension members and two brake heads, in which: the ends of the compression member are placed inside the housing of the unshaped cross section of the tension member and each of the end extensions are placed inside the housing of the channel shaped cross section of the compression member, the brake beam having two fasteners passing through holes placed at the ends of the tension and compression members at each of "u" shaped cross section side walls and through holes placed at the side walls of the end extensions in order to fasten the tension member, compression member and end extensions, and in which the brake heads are welded to the ends of the tension member.

10 Claims, 5 Drawing Sheets

BRAKE BEAM STRUCTURE

BACKGROUND OF THE INVENTION.

A. Field of the Invention

This invention relates to brake beams, and more particularly to a brake beam structure for railway cars in which the tension member, compression member and end extensions are joined by bolts and the brake head is welded to the tension member.

B. Description of the Related Art

There are well known brake heads assemblies for railway cars by which a brake shoe is pressed against a wheel in order to decrease or stop the rotational speed of the wheel and railway car.

Generally, the brake head assembly is held by a structure called "brake beam" mounted transversely in the bogie of a railway car and is linked to a lever, which applies a force in order to press the brake shoe against a wheel.

The brake beam generally comprises a compression member, a generally "V" shaped tension member having its ends coupled to the ends of the compression member, a brake shoe linked to the each end of the compression member, an end extension by which the brake beam is coupled to the bogie of a railway car and a fulcrum welded to the compression member and tension member, so that the fulcrum remains between the tension and compression members.

The simplest way to produce a brake beam is welding all the elements, without including any kind of fasteners, but the disadvantage of this kind of brake beam is the rigidity of the same, making the same very vulnerable to breakages.

Another way to produce a brake beam is assembling all or some of the elements by fasteners, in order to obtain a more flexible structure.

During use, high torsional moments are induced over the brake beam. These dangerous and harmful forces are translated to the compression and tension members and to the fulcrum, through the whole beam, causing a great stress in certain parts and elements of the brake beam when brakes are applied.

These harmful forces are specially high in the extremes of the brake beam where it is coupled to the bogie and where several components of the same are joined, such as the brake head, the tension member and compression member, making the extremes, critical points here a lot of harmful forces converge.

Due to the rigidity of the all welded brake beam, these harmful forces and high torsional moments cause breakages and a high wear, in the above referred points, and Often the components break during use.

U.S. Pat. No. 2,702,614 of Spaeth, discloses a railway brake beam structure in which the compression and tension members, converge from the middle of the beam towards each end where the inner upright face of the tension member meets and extends alongside the inner face of the channel web. The end portion of the tension member is upset and has a lip or shoulder to abut the end of the compression member. Applied to each end of the brake beam truss is a brake head. The rear or body portion of the head forms a pocket for receiving the ends of the compression and tension members.

Although Spaeth assembled structure is more flexible than the all welded brake beam, it has the same problem that is present in the all welded brake beam, which is an excess of harmful forces in the extremes of the brake beam, where the brake head and the tension and compression members converge in a similar way as in the all welded strut, which reduces the durability of the whole brake beam, and in some times the breaking of the same.

U.S. Pat. Nos. 2,722,291, 2,753,960 and 4,830,148, discloses the same type of assembling structure in which compression and tension members converge near each end of the beam and mount brake heads at the ends of the beam, which leads to the same disadvantages of the all welded brake beam and Spaeth brake beam.

Another brake beam structure with the same kind of assembling structure is disclosed in the U.S. Pat. No. 5,810,124 of Sandmann, which discloses a brake assembly containing a flat compression member, a flat tension member, a strut connected to the tension member and the compression member, and two brake heads with recesses. The ends of the compression member and the tension member are disposed within the recesses of the brake heads together with two fasteners per recesses; each of the fasteners is substantially perpendicular to the tension and compression members.

The two fasteners disclosed in the Sandmann patent, add some strength to the critical points of the brake beam assembly, but during normal use, these fasteners are subject to an excess of harmful forces, because said fasteners are the only means that maintains the brake head and the tension and compression members joined together and therefore, said fasteners are under a constant and excessive stress receiving all the torsional forces of the brake heads and tension and compression members. Said harmful forces produce, in addition of the above described problems present in this kind of assembling structure, a premature wear of the fasteners, and in a short period of time said fasteners may break, disassembling the brake head form the brake beam. Furthermore, due to the flat shape of the compression and tension members, the fasteners are able to fasten these elements in only two points, i.e. the sides of the tension and compression members.

In order to solve all the above referred problems, applicants developed a brake beam structure, which has the flexibility of an assembled brake beam and in which an adequate distribution of high torsional and harmful forces along the whole brake beam is achieved, obtaining a longer and more reliable lifetime.

Applicants brake beam comprises: a tension member having a first end and a second end, a compression member having a first end and a second end, two end extensions, a fulcrum coupled to the tension and compression members, and two brake heads coupled near each of the ends of the tension member, wherein: the tension member has a channel shaped cross section including a lower wall and two upwardly projecting side walls, each depending from an edge of the lower wall, forming a housing, and each end thereof having two or more pairs of opposite holes each longitudinally placed at each side wall of the channel shaped cross section; the ends of the compression member, are placed inside the housing of the tension member, said compression member having a cross section which includes two or more pairs of opposite holes longitudinally placed at the ends of the compression member, coinciding with the two or more pairs of holes of the tension member; each of the end extensions are placed at each end of said compression member, inside the compression member channel shaped cross section, said end extensions each having a quadrangular cross section including two or more pairs of opposite holes coinciding with the two or more pairs of opposite holes of the tension member and with the two or more pairs of holes of the compression member, and having an external section which is coupled to the bogie of a railway car; each of the opposite pair of holes receive a fastener in order to fasten the tension member, compression member and end extensions; and each of the brake heads are welded to the side walls of the tension member at the ends of said tension member.

Thanks to the position of the brake heads in the brake beam, a better distribution of high torsional and harmful forces along the whole brake beam is achieved and therefore the fasteners that maintains joined the tension, compression and end extensions are subject to lesser torsional and harmful forces. Furthermore, thanks to the u-shaped cross sections of the compression tension and end extensions and to the arrangement of the compression member and end extensions, which are placed inside the housing of the u-shaped cross section of the tension member, the fasteners passing through those elements, are able to fasten the compression member, tension member and end extensions at eight points i.e. at the two side walls of the u-shaped cross section of the tension member, the two side walls of the unshaped cross section of the compression member and at two side walls of the end extension, achieving a strong, durable and reliable structure.

SUMMARY OF THE INVENTION

It is therefore a main objective of the present invention to provide a brake beam structure comprising u-shaped compression and tension members, two end extensions, a fulcrum and two brake heads, in which the compression member is placed inside the housing of the u-shaped tension member and the end extension is placed inside the housing of the compression member and having two fasteners passing through holes placed at the ends of the tension and compression members and through holes placed at the side walls of the end extension, and in which the brake heads are welded to the ends of the tension member.

It is another main objective of the present invention to provide a brake beam structure which has the flexibility of an assembled brake beam and in which an adequate distribution of high torsional and harmful forces along the whole brake beam is achieved.

It is still a main objective of the present invention to provide a brake beam structure which has a longer and more reliable lifetime.

These and other objects and advantages of the brake beam of the present invention will become apparent to those persons having an ordinary skill in the art, from the following detailed description of the embodiments of the invention which will be made with reference to the accompanying drawings.

DETAILED DESCRIPTION OF THE INVENTION.

The brake beam of the present invention, will now be initially described in accordance with a preferred embodiment thereof, and making reference to FIGS. 1 to 5, comprises:

a "V" shaped tension member 1 having a first end e1 and a second end e1' having a channel shaped cross section including a lower wall lw1 which turns parallel to an horizontal axis at the ends of the tension member 1, and two upwardly projecting side walls sd1, sd1', each depending from an edge of the lower wall lw1 and each end having two pairs of opposite holes h1, h1', h2, h2' each longitudinally placed at each side wall sd1, sd1' at each end e1, e1' of the "v" shaped tension member. Said projecting side walls sd1, sd1', having a progressive widening at the ends e1, e1' of the tension member.

a compression member 2, having a first end e2 and a second end e2', each of which is placed inside the housing of the tension member channel shaped cross section at the ends e1, e1' of the tension member, said compression member 2 having a channel shaped cross section including an upper wall uw1 facing the tension member lower wall lw1, and two depending side walls sd2, sd2', each depending from an edge of the upper uw1 and each end having two pairs of opposite holes h3, h3', h4, h4' longitudinally placed at the ends e2, e2', coinciding with the holes h1, h1', h2, h2', said side walls sd2, sd2', having a progressive widening at the ends e2, e2' of the compression member 2;

a first extension (not shown) and a second extension m, each having a quadrangular cross section, and each placed inside the housing of the compression member channel shaped cross section at each end of the tension and compression members, including two side walls sd3, sd3', having two pairs of opposite holes h5, h5', h6, h6', coinciding with the two pair of opposite holes of the tension and compression members, and having an external section Es, depending from a side wall of the quadrangular cross section which is joined to the bogie of a railway car;

Four bolts b1, b2, b3, b4, each passing through each pair of the opposite holes placed at each end of the tension and compression members and at the side walls of the end extension, in order to fasten all the above referred elements, a fulcrum f connected to the tension 1 and compression 2 members;

two brake heads Bh1, Bh2, each having a first and a second half f1, f2, each having two extension members Ex1, Ex2, welded to the side walls sd1, sd2 of the tension member at the ends e1, e1' thereof and at both sides of the bolts b1, b5.

Although it has been described that the compression member has a channel shaped cross section, it can have any shape, or even be a hollow pipe, placed inside the housing of the unshaped cross section of the tension member 1.

Figure 1:
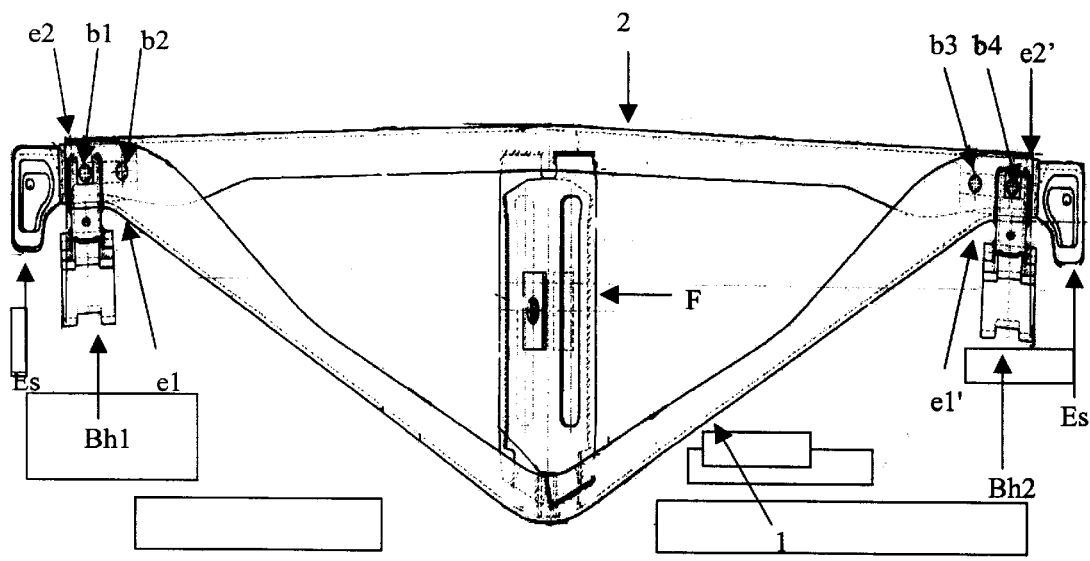
FIG. 1 is a conventional front view of the brake beam in accordance with the present invention.
Figure 2:
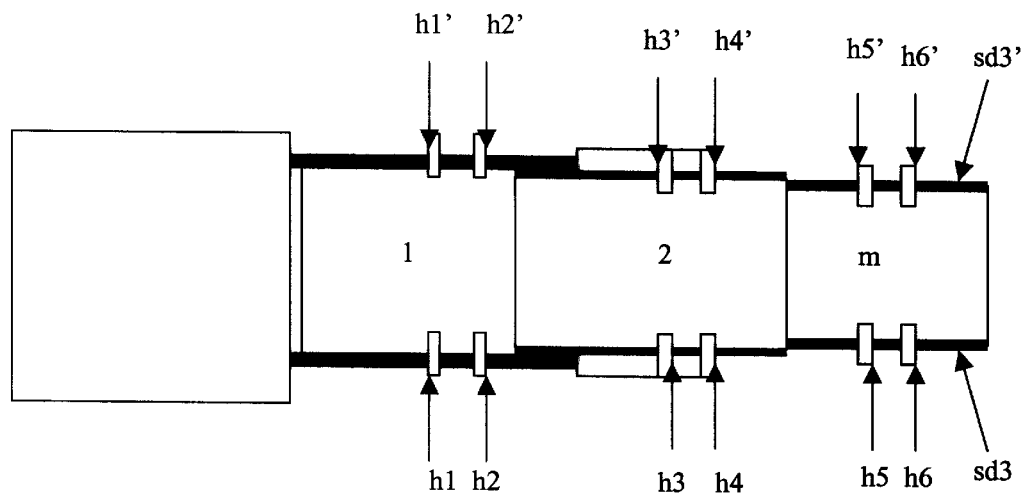
FIG. 2 is a partial upper view of the brake beam, in accordance with the present invention, showing an end of the tension member and compression member and showing an end extension disassembled.
Figure 3:
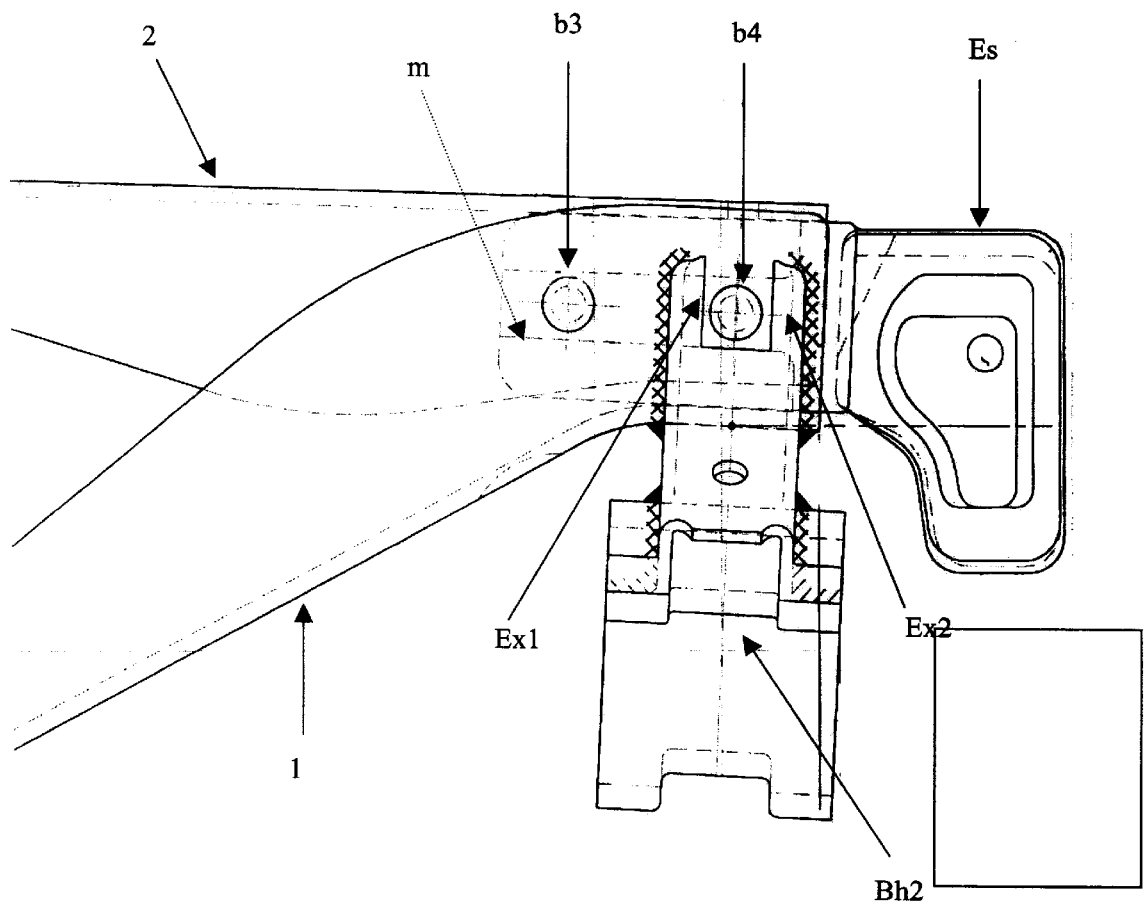
FIG. 3 is a partial front view of the brake beam, in accordance with the present invention.
Figure 4:
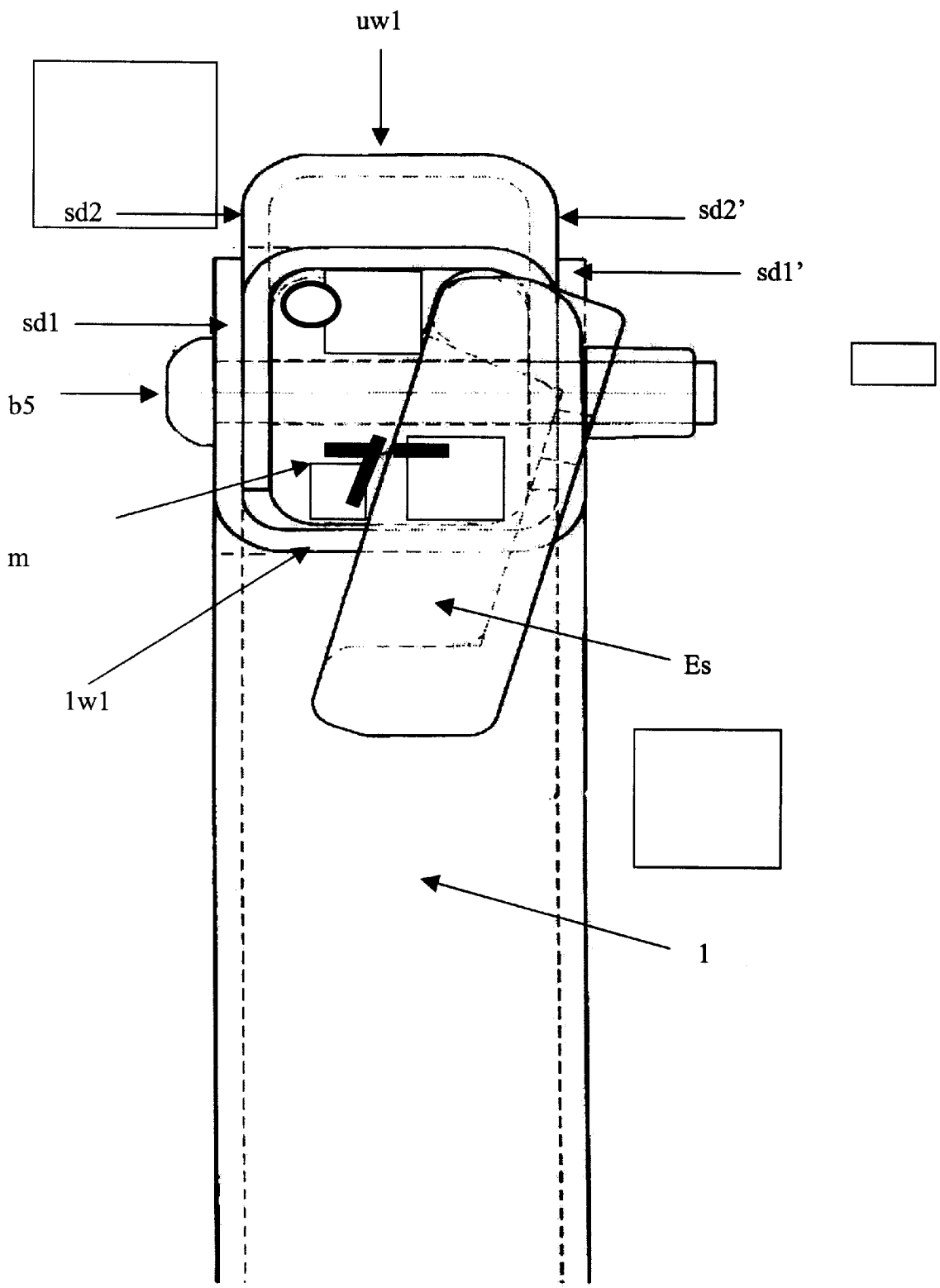
FIG. 4 is a partial side view of the brake beam, in accordance with the present invention showing the assembling of the compression member, tension member and end extensions.
Figure 5:
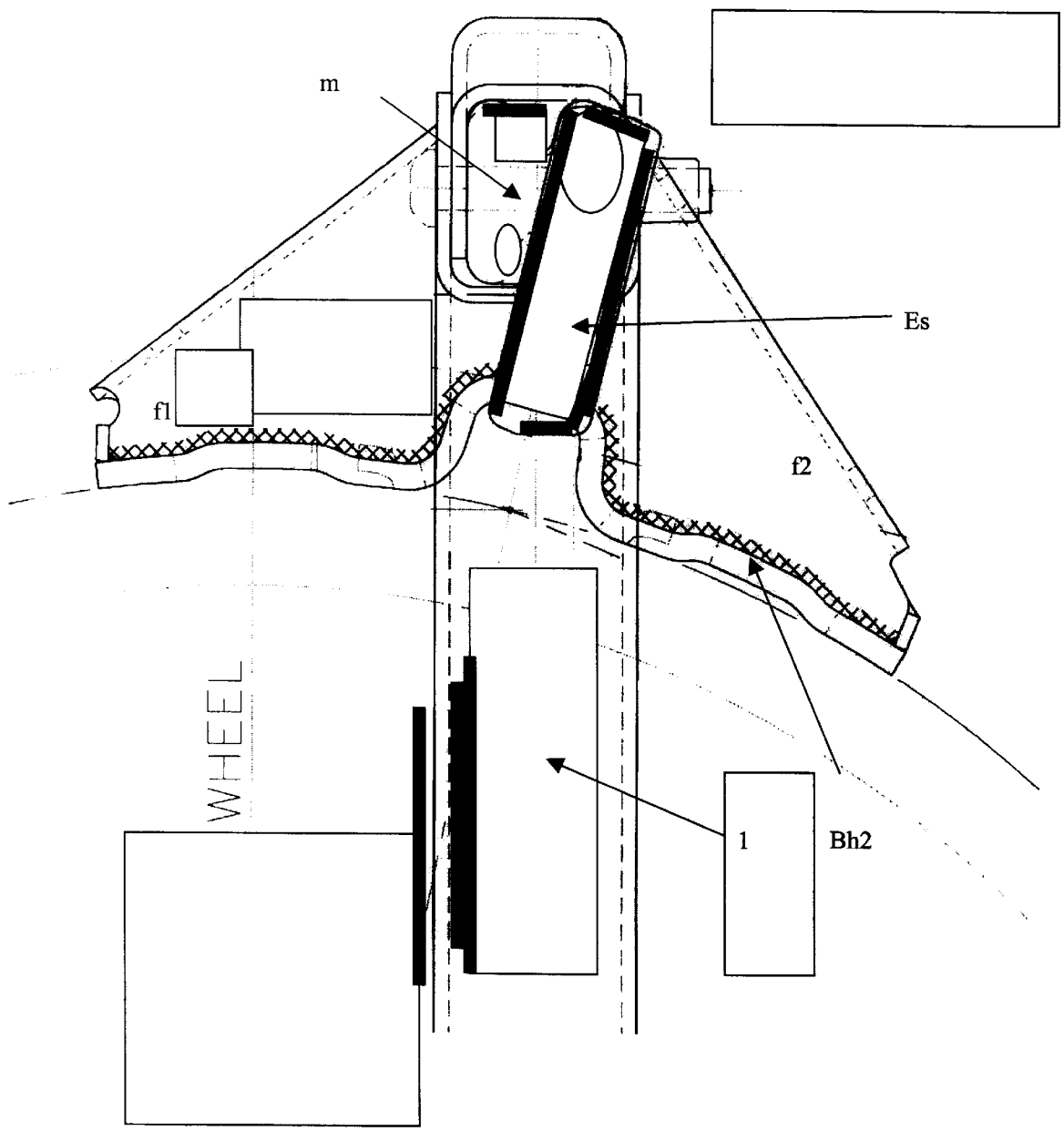
FIG. 5 is a partial side view of the brake beam, in accordance with the present invention showing the assembling of the compression member, tension member and end extensions, and further shoving a brake head.
Figure 6:
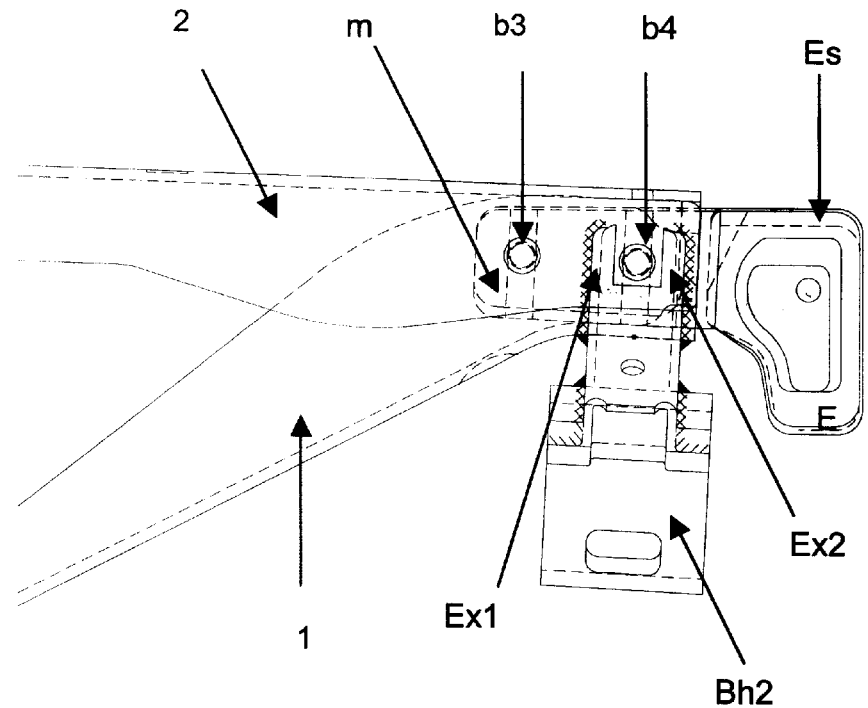
FIG. 6 is a partial front view of the brake beam in accordance with the present invention showing the tension member being placed inside the housing of the channel shaped cross section of the compression member and the extension being placed inside the cross section of the tension member.
Figure 7:
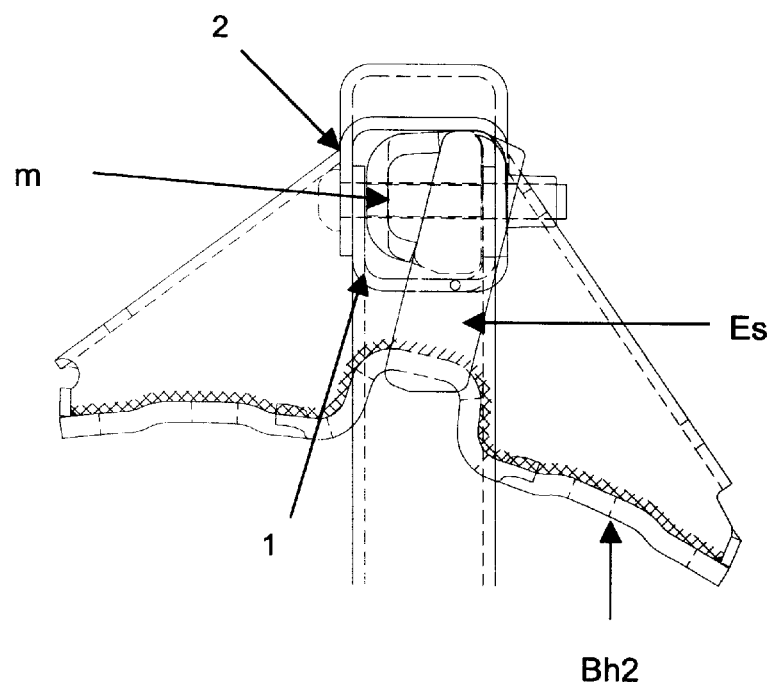
FIG. 7 is a partial side view of the brake beam, in accordance with the present invention showing the tension member being placed inside the housing of the channel shaped cross section of the compression member and the extension being placed inside the cross section of the tension member.

And although it has been described that the ends of the compression member are placed inside the housing of the unshaped cross section of the tension member, the ends of the same could be placed inside the housing of the unshaped cross section of the compression member. Thus, the end extension would remain inside the housing of the unshaped cross section of the tension member, as shown in FIGS. 6 and 7.

In this way the brake heads could be welded to the side walls of the u-shaped cross section of the compression member and the tension member cross section could have any shape or even be a hollow pipe, placed inside the housing of the u-shaped cross section of the compression member.

Furthermore, although it has been described that the ends of the tension and compression members and the side walls of the end extension has only two pairs of holes, they could have two or more pairs of opposite holes in order to receive an additional bolt by each additional pair of holes.

Finally it must be understood that the brake beam, of the present invention, is rot limited exclusively to the embodiments above described and illustrated and that the persons having ordinary skill in the art can, with the teaching provided by the invention, to make modifications to the design and component distribution of the brake beam of the present invention, which will clearly be within the true inventive concept and of the scope of the invention which is claimed in the following claims:

We claim:

1. A brake beam comprised of a tension member having a first end and a second end, a compression member having a first end and a second end, two end extensions, a fulcrum coupled to the tension and compression members, and two brake heads coupled near each of the ends of the tension member, wherein:

the tension member has a channel shaped cross section including a lower wall and two upwardly projecting side walls, each depending from an edge of the lower wall, forming a housing, and each end of the tension member having two or more pairs of opposite holes each longitudinally placed at each side wall of the channel shaped cross section;

the ends of the compression member, are placed inside the housing of the tension member, said compression member having a cross section which includes two or more pairs of opposite holes longitudinally placed at the ends of the compression member, coinciding with the two or more pairs of holes of the tension member;

each of the end extensions are placed inside the cross section of the compression member at each end of said compression member, and having a cross section including two or more pairs of opposite holes coinciding with the two or more pairs of opposite holes of the tension member and with the two or more pairs of holes of the compression member, and having an external section which is adapted to be coupled to a bogie of a railway car;

each of the opposite pair of holes receive a fastener in order to fasten the tension, compression and end extensions;

each of the brake heads are welded to the side walls of the tension member at the ends of said tension member.

2. The brake beam as claimed in claim 1, wherein the compression member has a channel shaped cross section.

3. The brake beam as claimed in claim 1, wherein the compression member comprises a hollow pipe.

4. The brake beam as claimed in claim 1, wherein the brake heads include an extension to be welded to the side walls of the tension member.

5. The brake beam as claimed in claim 1, wherein each of the fasteners are bolts.

6. A brake beam comprised of a tension member having a first end and a second end, a compression member having a first end and a second end, two end extensions, a fulcrum coupled to the tension and compression members, and two brake heads coupled near each of the ends of the tension member, wherein:

the compression member has a channel shaped cross section including an upper wall and two upwardly projecting side walls, each depending from an edge of the upper wall, forming a housing, and each end of the compression member having two or more pairs of opposite holes each longitudinally placed at each side wall of the channel shaped cross section;

the ends of the tension member, are placed inside the housing of the compression member, and said tension member having a cross section which includes two or more pairs of opposite holes longitudinally placed at the ends of the tension member, coinciding with the two or more pairs of holes of the compression member;

each of the end extensions are placed inside the cross section of the tension member at each end of said tension member, and having a cross section including two or more pairs of opposite holes coinciding with the two or more pairs of opposite holes of the compression member and with the two or more pairs of holes of the tension member, and having an external section which is adapted to be coupled to a bogie of a railway car;

each of the opposite pair of holes receive a fastener in order to fasten the tension, compression and end extensions;

each of the brake heads are welded to the side walls of the compression member at the ends of said compression member.

7. The brake beam as claimed in claim 6, wherein the tension member has a channel shaped cross section.

8. The brake beam as claimed in claim 6, wherein the tension member comprises a hollow pipe.

9. The brake beam as claimed in claim 6, wherein each of the brake heads includes an extension to be welded to the side walls of the compression member.

10. The brake beam as claimed in claim 6, wherein the fasteners are bolts.

* * * * *